United States Patent Office 3,793,294
Patented Feb. 19, 1974

3,793,294
PROCESS FOR THE PREPARATION OF VINYL
CHLORIDE POLYMERS
Carlhans Suling, Odenthal-Hahnenberg, Germany, assignor to Bayer Aktiengesellschaft, Leverkusen, Germany
No Drawing. Filed Oct. 15, 1971, Ser. No. 189,774
Claims priority, application Germany, Oct. 15, 1970,
P 20 50 723.7
Int. Cl. C08f 1/08, 1/62
U.S. Cl. 260—92.8 W          8 Claims

ABSTRACT OF THE DISCLOSURE

The object of the invention is a process for the preparation of high molecular weight vinyl chloride polymers having increased proportions of syndiotactic sequences and improved thermal stability. Polymerizing is carried out at low temperatures in an alcohol/water mixture as precipitation polymerization in the presence of a redox catalyst system, a complex compound and a lithium or zinc salt at pH-value below 7.

---

The invention relates to a process for the preparation of vinyl chloride polymers at temperatures of $-10°$ C. to $-40°$ C. by the polymerization of vinyl chloride in an aqueous alcoholic medium by a redox activated precipitation polymerization.

It is known that the amount of syndiotactic sequences in polyvinyl chlorides can be increased by keeping the reaction temperature during polymerization as low as possible. As described in Journal of Polymer Science 41 (1959), p. 73 et seq., the degree of syndiotacticity of the polymers produced increases with decreasing reaction temperature. A detailed description of the relationship between the structure of vinyl chloride polymers and the reaction temperature may also be found inter alia in Die Makromolekulare Chemie 95 (1966), pp. 187–204.

The preparation of sterically uniform polymers has previously generally been carried out by a solvent-free polymerization in which redox systems which contain boron alkyls as reducing components are used as activator systems. The polymerization medium used is excess monomer, as described e.g. in East German patent specification No. 44,270.

A disadvantage of solvent-free polymerization and of the initiator system used is the relatively low degree of conversion obtained in the polymerization process and the need to use the very highly reactive boron alkyls as reducing agents. Boron alkyls are relatively difficult to prepare and some are spontaneously inflammable in the presence of atmospheric oxygen or at least in the presence of oxygen if they are in a finely divided form.

Furthermore, it has been disclosed in British patent specification No. 931,628 to use mixtures of water and lower alcohols as a polymerization medium. Polymerization is in this case carried out as an emulsion polymerization and a redox system which consists of a mixture of peroxides, ascorbic acid and iron(II) salts is used as initiator system. Conversion rates of up to 75% are obtained by this polymerization process. A disadvantage of this polymerization process is that it must be carried out as an emulsion polymerization. The resulting alcoholic emulsions must be worked up by precipitation after encrustations and precipitates deposited from the labile emulsions have been removed.

According to "Die Makromolekulare Chemie" 95 (1966), page 190, vinyl chloride may be polymerized in an aqueous methanolic medium at temperatures of 0° C. to $-35°$ C. High yields of polymers are obtained when using the redox system hydrogen peroxide/iron(III) sulphate/ascorbic acid as activator system. This process has the disadvantage as indicated in the literature, that due to the composition of the initiator system the molecular weights of the polymers fall rapidly with decreasing reaction temperature. Lowering the polymerization temperature normally has the effect of producing polymers with higher molecular weights under otherwise the same conditions but the initiator system described here has the effect that the molecular weights of the polymers produced decrease with decreasing reaction temperature.

It is also known to produce polyvinyl chloride at low temperatures by polymerization in an aqueous dispersion. According to German patent specification No. 1,940,095, for example, the reaction medium used may be a mixture of water and alcohols and the activator system used is again a redox system which contains a peroxide as oxidizing component and Fe(II) ions and ascorbic acid as reducing agent. In the process according to the above-mentioned Offenlegunsschrift, the Fe(II) ions may, if desired, be replaced by other heavy metal ions or by mixtures of various heavy metal ions or by organic sulphinic acids. According to the features claimed for the invention, it is essential to add a diluent in the form of a polychlorinated organic compound to the polymerization medium. A disadvantage of this process is the use of dispersing agents and of the redox combination hydrogen peroxide/iron(II) ions/ascorbic acid since the thermal stability of the resulting vinyl chloride polymers is impaired both by the addition of the dispersing agents and by the use of iron(II) ions. It is known that iron ions have the effect of reducing the stability of vinyl chloride polymers even when used in only small quantities (Journal of Polymer Science 12, 543 (1954)). If iron or ascorbic acid used in the polymerization process described in the above-mentioned Offenlegunsschrift is replaced by an organic sulphinic acid, the polymerization yield is reduced.

It has also been disclosed in German patent specification No. 1,916,942 that vinyl chloride can be polymerized at low temperatures with the aid of mixtures of organic hydroperoxides, organic sulphites, derivatives of organic sulphinic acid and alkali metal alcoholates. This polymerization is carried out as a solvent-free polymerization. The polymers obtained by this process are distinguished by their improved thermal stability. A disadvantage of the process according to the above-mentioned Offenlegungsschrift is the low polymerization yield. In no case does the polymerization yield exceed 20%.

It has been found that vinyl chloride polymers which contain increased proportions of syndiotactic sequences and which have improved thermal stability are obtained by the polymerization of vinyl chloride at temperatures of between $-10°$ C. and $-40°$ C. (preferably between $-15°$ C. and $-30°$ C.) if the polymerization of vinyl chloride is carried out as a redoxactivated precipitation polymerization and redox systems consisting of hydrogen peroxide as oxidizing agent, salts of organic sulphinic acids as reducing agent and Cu(II) ions and ethylenediamino tetracetic acid as complex-forming agent are used in an aqueous alcoholic medium and polymerization is carried out at pH-values below 7.

This invention therefore relates to a process for the preparation of vinyl chloride polymers which contain increased proportions of syndiotactic sequences and which have improved thermal stability by the polymerization of vinyl chloride at low temperatures in aqueous alcoholic mixtures with the aid of redox systems as polymerization initiators, which process comprises carrying out the polymerization step as a precipitation polymerization at pH-values below 7 in the presence of an initiator system consisting of a hydroperoxide compound as oxidizing agent, an organic sulphinic acid as reducing agent and a complex compound from Cu(II) salt and ethylenediaminotetracetic acid in the presence of lithium salts or zinc salts at temperatures of between —10° C. and —40° C.

Polymers with high molecular weights are obtained in high yields by this process. The polymers are distinguished by very high thermal stability.

In contrast to dispersion polymerization, the process of precipitation polymerization is carried out by polymerizing the monomer in the form of a solution and not a dispersion, and the polymerization medium is chosen so that the insoluble polymer is immediately and completely deposited as a precipitate after conversion from the monomer.

In order to be able to carry out the polymerization at temperatures of —10° C. to —40° C. it is necessary to lower the freezing point of the aqueous reaction mixture sufficiently by the addition of alcohols to prevent the formation of ice. This addition of alcohols at the same time causes the monomeric vinyl chloride to dissolve in the reaction medium and enables polymerization to be carried out as a precipitation polymerization. The most suitable alcohol for this purpose is methyl alcohol. Ethanol, propanoyl and isopropanol are not quite such suitable components of the reaction mixture because the polymers obtained with their use have lower molecular weights than those obtained with methanol. On the other hand, if it is desired to adjust the molecular weight of the polymers to a particular value, it may be advantageous to use mixtures of alcohols with 2 or 3 carbon atoms to reduce the molecular weight. It has been found suitable to use a concentration of reaction medium in water such that the mixture of alcohol and water contains at least 20 parts by volume of water. The use of mixtures of alcohols and water is advantageous not only for economic reasons but because it has been found that polymerization proceeds more rapidly and more completely in mixtures of water and alcohols than in alcohols or mixtures of alcohols.

The initiator systems used are redox systems which contain hydroperoxide compounds such as hydrogen peroxides or tert.butyl hydroperoxide as oxidizing agents. Suitable reducing agents are aliphatic or aromatic sulphinic acids in general, such as benzene sulphinic acid, toluene sulphinic acid or aliphatic sulphinic acids such as ethane sulphinic acid, but aliphatic sulphinic acids such as hydroxymethyl sulphinic acid are particularly suitable. Since the stability of these sulphinic acids is limited, it is advantageous to use their soluble salts such as the alkali metal salts or preferably the zinc salt of hydroxymethane sulphinic acid.

The pH of the polymerization medium is very important for the efficiency of the system. Practically no polymerization takes place at pH-values above 8 and polymerization is only slight at pH-values below 2. The pH may be adjusted with mineral acids such as sulphuric acid but it is particularly advantageous to use aqueous solutions of sodium pyrosulphite to adjust the polymerization medium to the desired pH. These solutions are less acid in reaction than aqueous solutions of mineral acids and when introduced into the reaction medium in the course of polymerization they do not give rise too localised excessive hydrogen ion concentrations which would slow down polymerization.

The quantity of oxidizing agent used, based on the quantity of monomer used, is between 0.08 and 2% by weight, depending on the reaction temperature, and preferably 0.1 to 1% by weight of hydrogen peroxide, based on the amount of vinyl chloride. The quantity of reducing components used is also 0.08 to 2% by weight, based on vinyl chloride, but preferably 0.09 to 0.9% by weight. The reducing components should generally be added in less than equivalent quantities based on the oxidizing component but at the most in equivalent quantities.

The concentration of monomeric vinyl chloride in the reaction mixture is determined within wide limits by the proportion of water to alcohol in the mixture and by the reaction temperature employed. A characteristic feature of vinyl chloride polymerization carried out as precipitation polymerization is that vinyl chloride is dissolved in the reaction medium. Whereas vinyl chloride is completely soluble in methanol, ethanol, propanol and isopropanol within the temperature range employed according to the invention, its solubility in mixtures of these alcohols with water is limited and decreases with increasing proportion of water and decreasing temperature of the system. An essential condition for the quantity of the polymers, however, is that the solubility of the monomer in the mixture of alcohols and water is not exceeded during polymerization. If this condition is not observed, very coarse lumps of polymers which are very difficult to dissolve are produced and the preparation of homogeneous spinning solutions becomes impossible. Such polymers are therefore useless as starting materials for the synthesis of threads and fibres which must be spun from solutions. It has been found satisfactory to use a maximum of 1 part by volume of monomer to 2 parts by volume of solvent mixture but it is preferred to operate in the range of 4 to 9 parts by volume of solvent mixture to 1 part by volume of vinyl chloride and the best polymers are obtained by a process which is technically particularly useful in which 5 to 8 parts of solvent mixture are used to 1 part of vinyl chloride.

The reaction mixture should be between —10° C. and —40° C. according to the degree of syndiotacticity desired. Particularly advantageous results are obtained with the process according to the invention if polymerization is carried out at temperatures of between —15° and —30° C. The degree of syndiotacticity of the resulting polymers is determined primarily by the reaction temperature and exact temperature control is therefore essential to obtain polymers with reproducible properties.

In order to achieve thorough mixing of the resulting polymer paste it is advantageous to add a surface-active substance to the polymerization medium. Sulphuric acid esters of long-chain fatty alcohols are particularly suitable for this purpose. The quantity of surface-active substance should be between 0.05 and 0.3% by weight, based on vinyl chloride, and should be as low as possible in order to eliminate adverse effects on the polymer as far as possible. If the process is carried out completely without the addition of surface active substances, encrustations of polymer are readily formed on the walls of the vessel and on the stirrer and it becomes difficult to remove residues of monomer and portions of the initiator system, which impair the quality of the polymer, by simply washing and rinsing during the working-up process.

To ensure that the polymer will be deposited in the form of granules, it is necessary to add to the polymerization medium soluble salts of metals which are not changed in their valency, i.e. their stage of oxidation, by the constituents of the initiator system. Especially advantageous results are obtained by adding lithium salts or zinc salts such as lithium chloride, lithium nitrate or zinc chloride, zinc sulphate and zinc nitrate to the polymerization medium for this purpose.

The initiator system also contains complex compounds of copper(II) salts and ethylenediamonotetracetic acid. These complex salts are advantageously produced by combination of the components in the polymerization medium. It is particularly the use of these complex compounds of copper and ethylenediaminotetracetic acid which has the advantage over the use of copper salts and ascorbic acid of giving rise to polymers with improved thermal stability. The quantity of copper complexes used may vary within wide limits and lies between 0.01 and 0.001%, based on the vinyl chloride. The vinyl chloride polymers produced according to the process, which have increased proportions of syndiotactic sequences, are particularly suitable for the manufacture of difficult inflammable threads and fibres. The following example illustrates more particularly the invention.

EXAMPLE 400 parts by weight of methyl alcohol,
900 parts by weight of water which has been freed of salt,
0.2 part by weight of copper sulphate,
0.2 part by weight of sodium lauryl sulphate,
0.125 part by weight of ethylenediaminotetracetic acid,
0.6 part by weight of sodium hydroxymethyl sulphinate, and
0.1 part by weight of a N solution of $H_2SO_4$ are introduced into a polymerization vessel is flushed with nitrogen and the reaction mixture is adjusted to a temperature of $-25°$ C. A mixture of 20 parts by weight of methyl alcohol, 20 parts by weight of salt-free water and 1 part by weight of hydrogen peroxide (30%) is then introduced into the stirred solution.

300 parts by weight of vinyl chloride are then introduced into the stirred solution after 30 minutes and care is taken to ensure that the temperature in the reaction vessel is $-25°$ C. A mixture of 180 parts by weight of methyl alcohol,
180 parts by weight of salt-free water,
0.8 part by weight of sodium hydroxymethyl sulphinate, and
0.06 part by weight of sodium lauryl sulphate is then introduced into the reaction vessel in the course of 2 hours and at the same time a mixture of
200 parts by weight of methanol,
200 parts by weight of salt-free water, and
2 parts by weight of hydrogen peroxide (30%)

are introduced into the reaction vessel through a second inlet in the course of 2 hours.

200 parts by weight of vinyl chloride are then forced under pressure into the reaction vessel in the course of 1 hour. After 15 hours, the polymer paste is introduced into a mixture of 2000 parts by weight of water,
20 parts by weight of lithium chloride, and
2 parts by weight of sodium pyrosulphite with stirring.

The precipitate is centrifuged off, washed with water and dried in a circulating air cupboard. About 305 parts by weight (61% of the theory) of a pourable white polymer is obtained which has a viscosity $[\eta]$ of 2.55 in cyclohexanone and a DS-value of 2.3 in the infrared spectrum.

The viscosity $[\eta]$ is determined from solutions of polyvinylchloride in cyclohexanone (see B. Vollmert, Grundriss der makromolekularen Chemie, Verlag Springer Göttingen, 1962, p. 243). The term "DS-value" means the ratio of the infrared-absorption at 635 cm.$^{-1}$ and 692 cm.$^{-1}$ (see Journal of Polymer Science, December 1959, vol. 41, page 73–82) and Journ. Amer. Chem. Soc. 82, (1960), page 749. Syndiotactic polyvinylchlorides which are preferably used for the production of fibers have DS-values in the range of between 2,0 and 3,0.

What we claim is:

1. A process for the preparation of high molecular weight vinyl chloride polymers which comprises polymerizing vinyl chloride in a mixture of alcohol and water at temperatures of between $-10°$ C. and $-40°$ C. that polymerizing is carried out as a precipitation polymerization at pH-values below 7 in the presence of an initiator system consisting of a hydroperoxide compound as oxidizing agent, an organic sulphinic acid or a salt thereof as reducing agent and a complex compound from a Cu(II) salt and ethylenediaminetetraacetic acid.

2. The process of claim 1, wherein said polymerization is carried out at a pH-value between 3 and 6.

3. The process of claim 1, wherein said pH-value is adjusted by the addition of sulphuric acid.

4. The process of claim 1, wherein said pH-value is adjusted by the addition of sulphurous acid.

5. The process of claim 1, wherein said pH-value is adjusted by the addition of sodium pyrosulphite solutions.

6. The process of claim 1, wherein said organic sulphinic acid is a water soluble alkali or zinc salt of hyroxymethyl sulphinic acid.

7. The process of claim 1, wherein said hydroperoxide compound is hydrogen peroxide.

8. The process of claim 1, wherein said alcohol is methanol.

References Cited
UNITED STATES PATENTS 2,697,700  12/1954  Urgneck et al. ____ 260—92.8 W

FOREIGN PATENTS 2,015,158  6/1970  France _____ 260—92.8 W

JOSEPH L. SCHOFER, Primary Examiner
JOHN KIGHT III, Assistant Examiner